(12) United States Patent
Fernandez

(10) Patent No.: US 7,483,529 B2
(45) Date of Patent: Jan. 27, 2009

(54) INSTALLATION FOR DISTRIBUTING DIGITAL SIGNALS

(75) Inventor: Thierry Fernandez, Courbevoie (FR)

(73) Assignee: Laboratoire Europeen ADSL Leacom Fastnet, Cesson Sevigne (FR)

( * ) Notice: Subject to any disclaimer, the term of this patent is extended or adjusted under 35 U.S.C. 154(b) by 543 days.

(21) Appl. No.: 10/524,494

(22) PCT Filed: Aug. 14, 2003

(86) PCT No.: PCT/FR03/50029

§ 371 (c)(1),
(2), (4) Date: Feb. 8, 2006

(87) PCT Pub. No.: WO2004/017535

PCT Pub. Date: Feb. 26, 2004

(65) Prior Publication Data

US 2006/0209940 A1    Sep. 21, 2006

(30) Foreign Application Priority Data

Aug. 14, 2002  (FR) .................................. 02 10344

(51) Int. Cl.
*H04M 1/00* (2006.01)

(52) U.S. Cl. ................................. 379/399.01
(58) Field of Classification Search ............. 379/399.01
See application file for complete search history.

(56) References Cited

U.S. PATENT DOCUMENTS

| 6,040,759 | A | 3/2000 | Sanderson |
| 6,141,356 | A | 10/2000 | Gorman |
| 7,199,699 | B1 * | 4/2007 | Gidge ................... 340/310.11 |
| 2002/0090010 | A1 | 7/2002 | Bader |
| 2003/0101426 | A1 * | 5/2003 | Sarkinen et al. ............... 716/12 |

FOREIGN PATENT DOCUMENTS

| FR | 2797131 | 2/2001 |
| GB | 2313273 | 11/1997 |
| GB | 2348787 | 10/2000 |
| WO | WO 95/19070 | 7/1995 |
| WO | WO 01/35544 | 5/2001 |

* cited by examiner

*Primary Examiner*—Ramnandan Singh
(74) *Attorney, Agent, or Firm*—Boyle Fredrickson, S.C.

(57) ABSTRACT

The invention concerns a digital signal distributing installation comprising a first coupler to be connected to an ADSL line input and to an electric power distribution line, an ADSL modem with a first and a second port, and a second coupler to be connected to the first port of the modem and to the electric power distribution line. Said installation is enhanced by adding thereto an auxiliary electric power distribution line, and a filtering circuit interposed between the electric power distribution line and the auxiliary electric power distribution line.

20 Claims, 1 Drawing Sheet

INSTALLATION FOR DISTRIBUTING DIGITAL SIGNALS

Figure 1:
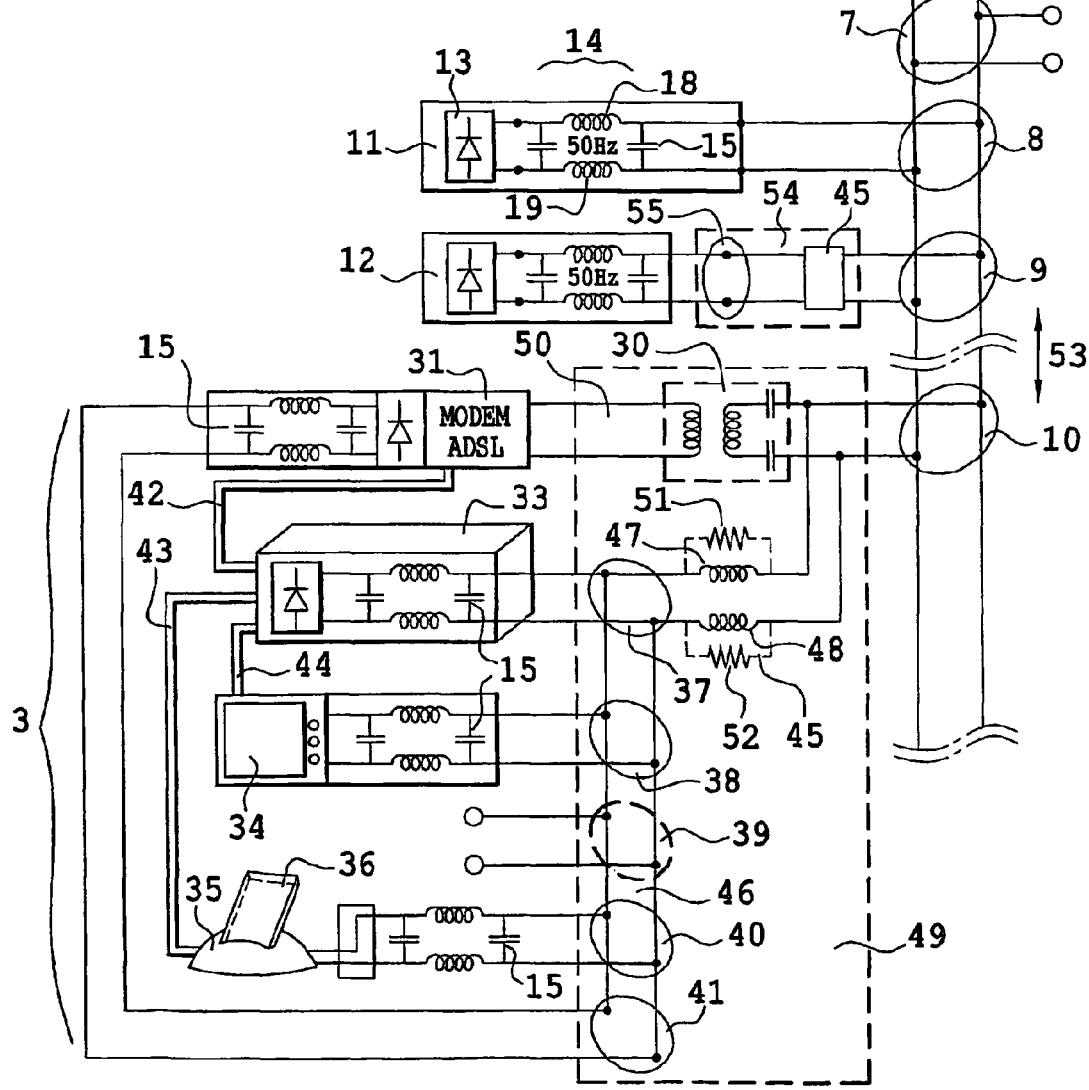

The object of the present invention is an installation for distributing digital signals, particularly digital signals previously conveyed by a telephone line and transmitted according to ADSL, or more generally XDSL, type technology to correspond to all variations of this type of transmission. Following the disclosure, we will discuss ADSL (Asynchronous Digital Subscriber Line) type transmission. This technology is a technology by which the same telephone line, often a twisted pair, transmits signals over different frequency ranges. A first frequency range is situated between 0 KHz and approximately 35 KHz or between 0 KHz and approximately 100 KHz respectively for conventional or digital telephone transmission. A second frequency range spreading from approximately 100 KHz to 3 MHz technically speaking, and in practice up to 1.2-MHz, is utilized to transmit high-speed digital signals.

ADSL transmission technology corresponds first to a need, that of transmitting digital information at a high speed (in the second frequency range) and secondly to a utilization of existing infrastructures. Twisted pairs already connect subscribers with telephone exchanges, which were installed in previous decades. ADSL technology presents the very important advantage of not requiring any additional infrastructure construction in comparison with radiofrequency access networks, radio relay systems, or optical fiber transmission, and furthermore of allowing flow rates that are completely comfortable and certainly sufficient.

One of the problems encountered in an installation for transmitting digital signals, particularly a domestic installation, is the manner in which houses or professional offices are equipped. In fact, the more locations that are equipped, at multiple sites, with electric connection terminals for connecting all desired apparatuses, the more unorganized is the number and distribution of telephone inlets. The result is that the installation locations of equipment using information transmitted by an ADSL line are imposed in a location where telephone inlets are available. In practice, in a housing unit or office to be equipped, the outlet distribution rate is on the order of 0.5 outlets per square meter while the distribution rate of the telephone outlets is on the order of 0.01 per square meter.

Under these conditions, achieving new digital signal distribution installations from an ADSL line have been imagined. These new installations comprise a coupling circuit for the signals transmitted by the ADSL line to a local electric network, that of a house for example. Carrier currents then perform the transmission. In all other locations where an electric outlet is situated, it is then possible to install not only equipment for using digital signals, typically a microcomputer, but also a modem, particularly an ADSL type modem, also equipped with a coupler for retrieving or injecting digital signals on the electric power distribution line. Eventually, such an installation disposes an upstream coupler, typically close to any telephone inlet that would itself be close to an electric outlet, for example with a proximity on the order of twelve or fifteen centimeters. Then in all other sites of the locations it is possible to install other equipment to have use of the distribution in the entire installation.

However, in practice, one realizes that this type of installation does not function as effectively as desired. In fact, tests are performed with ADSL modems connected to a coupler while, in addition, another remote coupler retrieves ADSL signals on a telephone line and injects them over an electric distribution line. These tests have shown that the installation operates well. On the other hand, when one wants to use signals produced by the modem in a microcomputer connected on the network, problems occur. These problems manifest themselves in the form of a rate of bit errors that is clearly greater than that of an unloaded utilization. The origin of these problems is unexplained. Consequently, the main problem to resolve by the present invention is that of making a solution that is theoretically possible into a reality.

In the invention one realizes then that all electronic equipment utilized and connected over the network near the coupler having an electric power circuit capable of transforming an electric signal sector, typically 220 alternating current voltage (in some places 110 alternating current voltage) into a range of direct current voltages, is graduated between three and twelve volts. One realizes in the invention that these power circuits are presented on the plane of their equivalent diagram, in the form of a capacitor that is directly in parallel on the electric power distribution line. The capacitor of this equivalent diagram is connected to two series inductances in each of the branches (in the uniphase case). Such a reactive type circuit is tuned to perform as a pure resistance at 50 Hz or 60 Hz, the oscillation frequency of the electric power signal. On the other hand, in the ranges utilized for ADSL transmission, between 100 KHz and 1.2 MHz, these power circuits perform like short circuits. In consequence, one understands the reasons for which the transmission in these frequency ranges is not at all effective. The signal available at the input or output line of the ADSL modem is damped.

In the invention, to then resolve this problem, equipping the coupler with an electric power supply to power the equipment using the ADSL transmission is provided. This electric power supply comprises a filtering circuit interposed between the electric power circuits of the devices using the signals and the main electrical distribution line in the locations. In practice, one comprises an auxiliary electric distribution line situated on the other side from this filtering circuit with relation to the main electric distribution line.

It results that the apparatus using the ADSL signals no longer forms short circuits in the ADSL frequency ranges, on the main electric distribution line. The coupling circuit by carrier currents, being situated upstream from this filtering circuit, thus functions correctly.

In addition, as concerns the other pieces of equipment installed in the same locations, provided that the pieces of equipment are far enough from an outlet thus equipped for the filtering circuit, it is noticed that the short circuits that their power circuit may insert are not as cumbersome as those that have been neutralized. In fact, even if a piece of equipment of this type is connected in another site at the same locations, and even if it inserts a low impedance in the relevant frequency ranges at the site of its own connection on the electric distribution line, this low impedance is seen from the coupling circuit as the impedance characteristic of the line, or as a considerable fraction of this impedance characteristic. This impedance characteristic fraction is of course different from zero. For the frequencies utilized, the wavelength is 100 meters at minimum (at 3 MHz). Considering the nature of the diverse propagation reflections produced in different extremities of electric distribution networks, such remote short circuits are not inserted at the retrieval site by the ADSL signal coupler with the modem.

Consequently, the object of the invention is an installation for digital signal distribution comprising An ADSL type modem with a first and a second port, A first coupler connected first to the first port of the modem and second to an electric power distribution line, Characterized in that the invention comprises An auxiliary electric power distribution line, A filtering circuit interposed between the electric power distribution line and the auxiliary electric power distribution line, A single housing to contain the filtering circuit and the first coupler, and in that The auxiliary electric power distribution line comprises multiple standardized electric outlets.

The invention will be better understood upon reading the following description and examining the accompanying figures. The figures are presented for indication purposes only and in no way limit the invention. The single FIGURE, FIG. 1, shows:

FIG. 1: the representation of a digital signal distribution installation according to the invention.

FIG. 1 shows a digital signal distribution installation according to the invention. This installation is designed to transmit signals received by the telephone line 1 connected in addition to a remote public-type telephone exchange and situated for example at one or two kilometers from the locations at which the installation is installed. These signals are destined for a piece of equipment 3 comprising circuits for using ADSL signals conveyed by line 1. The installation is designed to be connected to an electric power distribution line 4 within the locations, a home of a private individual or locations of a company's offices, even those of a factory. Line 4 comprises numerous branchings, not shown here, and electric outlets such as 5 to 10 on each of these branchings. Some outlets, such as 5 to 7, are not utilized by the equipment. Others, such as 8 and 9 are utilized by all types of equipment such as 11 and 12. These pieces of equipment may be an installation for a television, an alarm communications center, a microwave oven, electric heating and so on. Some of these pieces of equipment, particularly when they are electronic, necessitate the presence of an electric power circuit 13 connected to the line 4 through a connection circuit. The equivalent diagram 14 of this assembly comprises an input capacitor 15, in parallel with the two branches 16 and 17 of the line 4 and two series inductances 18 and 19 with each of these branches. As indicated previously, the operation of this circuit 13 is such that, at 50 Hz or 60 Hz, it performs as a pure nonreactive impedance. On the other hand, in high frequencies only the capacitor 15 is seen, and one may consider that at the site of a relevant outlet 8, a short circuit may be inserted.

The installation of the invention comprises, according to that that has been previously indicated, a coupler 21 connected first to the line 1 and second to the line 4 near an inlet 20 for line 1 and an outlet 5 connected to line 4. In practice, considering that the telephone line 1 will also be used for transmission of conventional telephone signals, analog or digital, a separator circuit 22 will be installed between line 1, a circuit closer 20, and the coupling circuit 21. This separator comprises in a conventional manner a first low-pass filter 23 connected in input to line 1 and in output to a telephone installation 24, here schematically represented. The separator 22 also comprises a high-pass filter 25 connected in input to line 1 and in output to coupler 21. The coupler 21 is a conventional type coupler, comprising in principle a primary winding 26 and a secondary winding 27 of a transformer, as well as preferably a certain number of components such as capacitors 28 and 29 allowing a better frequency adaptation for the coupling.

Known installations comprise in addition a second coupler 30, of the same type as the coupler 21, and connected first to the line 4 on an outlet 10, and second to an ADSL modem 31. The device 3 for using the ADSL signals comprises in an example a microcomputer 33 with its keyboard (not represented), a display screen 34 and diverse peripherals such as a printer (not represented) or a connection console 35 for a personal assistant 36 to be put in contact with the computer 33. One will note that the modem 31 must itself be powered. Considering the presence of other pieces of equipment, of the recording equipment, portable telephone charger, alarm radio, etc. type, it is possible that a significant number of electric outlets such as 37 to 41 are found in an environment that is close to the circuit 30, all connected to a power circuit of the same type as that 13 of the apparatus 11. In addition, all equipment devices 3 are interconnected by data transmission connections such as 42 to 44. The proximity implied above is a proximity on the order of one to two meters.

To prevent the powering of the apparatuses 31, 33, 34, 35 and others from forming a fatal short circuit for transmitting ADSL type signals on line 4, a filtering circuit 45 is provided in the invention and is placed in the intermediate position between the main electrical power distribution line 4 and an auxiliary electric power distribution line 46. The outlets 37 to 41 are mounted on the auxiliary line 46. The filtering circuit 45 is very simple. In principle it comprises at least one inductance such as 47 mounted on at least one of the branches connecting a strand of line 4 to a strand of line 46. Preferably, it will comprise another inductance 48 mounted on another branch connecting the second strand of line 4 to the second strand of line 46.

If instead of a uniphase line 4 one deals with a three-phase line, the mounting would be the same type. It would very simply have three series inductances mounted on each of the strands connected to the strands of line 4, particularly for reasons of equilibrium.

The operation of this device is as follows. In low frequency, particularly at 50 Hz and 60 Hz, inductances 47 and 48 are seen as short circuits. They do not interfere with the transmission of electric waves at all, all the more so as the electric consumption of the electronic apparatuses is low, from 10 to 100 watts. It results that the pieces of equipment 31, 33, 34 and 35 are powered normally. On the contrary, in high frequency, the inductances 47 and 48 are seen as high value impedances. Consequently, the equivalent diagram resulting from the presence of these series impedances 47 and 48 with any one of the power input capacitors 15 of the apparatuses 31, 33, 34 and 35 is seen, from line 4, as a high impedance, despite the presence of short circuits 15. It results from this situation that, on line 4, ADSL type signals are not damped by the power circuits of the installation devices 3. These ADSL signals thus are normally retrieved on the main line 4 by the coupler 30. They are also normally transmitted to the modem 31 that uses them and transmits them by its connection 42 to the microcomputer 33.

Practically, to facilitate its utilization, the collection of the coupler 30, the filtering circuit 45, and the auxiliary line 46 with its outlets 37 to 41 in a single housing 49 is provided. Such a housing 49, which is then presented as a conventional type adapter, comprises outlets 37 to 41, normally female type, in parallel on the line 46, as well as a male outlet to be able to plug into the female outlet 10 mounted on line 4. The outlets 37 to 41 are standardized according to regionally accepted formats. In addition, the housing 49 comprises a port 50, particularly an RJ 11 type port, to be connected to the modem 31. However, it is possible to provide the equipment differently, in particular to provide the filtering circuit 45, the auxiliary line 46 and the outlets 37 to 41 in the same housing while the coupler 30 would be in another housing. It is also possible to combine only the coupler 30 and the filtering circuit 45, or the coupler 30 and the line 46 in the same housing.

In order to ensure an optimal operation of the filtering circuit 45, the latter is tuned, as much as possible, by taking into account the capacitance values of the capacitors 15 in parallel with the filtering circuit. In practice, a typical capacitance value of the input capacitors 15 is on the order of 50 nF. By supposing the presence of four pieces of equipment, the capacitance inserted at the terminals of inductances 47 and 48 is on the order of 200 nF. One then tunes the oscillating circuit comprised by the inductances and the inserted capacitance so that the resonance frequency is much less than the ADSL signal utilization frequencies. For example, since the ADSL signals are usable beyond 100 KHz, it is arranged so that the tuning frequency is on the order of 3 KHz. This leads to values for inductances 47 and 48 between 200% and 25% of 4 mH each.

It is thus comprised of an oscillating circuit due to this tuning. Preferably, one then equips each inductance 47 and 48 with a parallel resistance 51 and 52 respectively to prevent the oscillating circuit from having a too high overvoltage coefficient, and from reinjecting signals that could interfere with the operation of the telephone installation 24 on line 4.

The installation thus achieved operates well, so long as a distance 53 that is greater than a threshold, in practice greater than five meters, exists between an outlet 9 to which is connected a piece of electronic equipment 12, equipped with a power supply such as the cumbersome power supply 13, and an outlet 10 to which the housing 49 will be connected. Possibly, if the distance 53 is too low, the achievement of a filtering circuit such as 45 associated, in a housing 54, first with a male connector to a female outlet 9 mounted on line 4 and second to a female outlet 55 to receive the connection of a piece of electronic equipment 12 is provided in the invention. The presence of such an electric connection housing 54 is not useful if the apparatus 11 connected on an outlet 8 is a conventional electric consumption apparatus, such as an iron, microwave oven or other types not comprising power supply devices such as 13, or if the distance that separates the outlet 8 from the outlet 10 of the ADSL modem is much greater than the threshold indicated previously.

The invention claimed is:

1. A digital signal distributing installation comprising
   an ADSL modem with a first and a second port
   a first coupler to be connected to the first port of the modem on the one side and to an electric power distribution line on the other side,
   characterized in that it comprises
   an auxiliary electric power distribution line,
   a filtering circuit interposed between the electric power distribution line and the auxiliary electric power distribution line,
   one common housing for holding the filtering circuit and the first coupler and in that
   the auxiliary electric power distribution line comprises multiple standardized sockets.

2. The installation as set forth in claim 1, characterized in that it comprises a second coupler to be connected to an ADSL line input on the one side and to the electric power distribution line on the other side.

3. The installation as set forth in claim 2, characterized in that the second coupler is located at the end of telephone transmission line.

4. The installation as set forth in claim 1, characterized in that it comprises, in the ADSL line input, a separator circuit for separating telephony signals from ADSL signals.

5. The installation as set forth in claim 1, characterized in that the filtering circuit comprises series inductance in a branch connected to a connection of the electric power distribution line.

6. The installation as set forth in claim 1, characterized in that the filtering circuit comprises series inductance in each of the branches connected to the connections of the electric power distribution line.

7. The installation as set forth in claim 6, characterized in that an inductance has a value such that it makes certain that the resonance frequency of the circuit it forms with an input capacity of a supply circuit connected to the auxiliary line is far less than 100 kHz, for example on the order of 30 kHz, said value being in practice on the order of 4 MHz.

8. The installation as set forth in any 4-4he-eleimsclaim 1, characterized in that, on the electric power distribution line, the impedance of the filtering circuit is in excess of 2 kilohms in the frequency range used for ADSL transmission.

9. A digital signal distribution installation comprising:
   a housing that houses:
   (a) a coupler linked to an alternating current electrical distribution line and linked to a DSL model with the coupler disposed therebetween, wherein the coupler permits high frequency digital signals carried by the electrical distribution line to pass between the electrical distribution line and the DSL modem while blocking flow of low frequency alternating current to the DSL modem; and
   (b) a filtering circuit linked to the alternating current electrical distribution line and a plurality of electrical power sockets carried by the housing, the filtering circuit comprising with the filtering circuit disposed therebetween:
   (1) a pair of inductors with one inductor connected to one branch of the electrical distribution line and the other inductor connected to another branch of the electrical distribution line and providing an impedance that opposes passage of high frequency digital signals to any appliance connected to one of the electrical power sockets; and
   (2) a pair of resistances with one resistance connected to the one branch in parallel with the one inductor and the other resistance connected to the another branch in parallel with the other inductor.

10. The digital signal distribution installation of claim 9 further comprising a plug disposed exteriorly of the housing that is plugged into an electrical power socket of the building that is linked to the electrical distribution line.

11. The digital signal distribution installation of claim 9 further comprising an RJ11 socket carried by the housing that receives a plug of the DSL modem.

12. The digital signal distribution installation of claim 11 wherein the DSL modem comprises an ADSL modem.

13. The digital signal distribution installation of claim 9 wherein each inductor has an inductance that limits the resonance frequency to less than 100 kilohertz.

14. The digital signal distribution installation of claim 9 wherein each inductor has an inductance selected to provide the filtering circuit with an impedance of at least 2 kilohms over the frequency range of the digital signals.

15. A device for distributing digital signals carried by an alternating current electric power line in a building having a plurality of alternating current power sockets each able to supply alternating current at a voltage, the device comprising:
   (a) a case having a plug that can be plugged into one of the alternating current power sockets and having a plurality of spaced apart alternating current power sockets each of which can receive a plug of an electrical appliance and a digital signal connector;

(b) a coupler linked to alternating current provided to the device via its plug and linked to the digital signal connector, the coupler blocking the alternating current while permitting passage of the digital signals therethrough; and (c) a filtering circuit linked to alternating current provided to the device via its plug and linked to each one of the plurality of spaced apart alternating current power sockets, the filtering circuit blocking the digital signals while permitting passage of alternating current to each one of the plurality of alternating current power sockets.

16. The device of claim 15 wherein the filtering circuit comprises a plurality of inductors and a resistance in parallel with each one of the plurality of inductors.

17. The device of claim 16 wherein each inductor has an inductance that limits the resonance frequency to less than 100 kilohertz.

18. The device of claim 16 wherein each inductor has an inductance selected to provide the filtering circuit with an impedance of at least 2 kilohms over the frequency range of the digital signals.

19. The device of claim 16 wherein the coupler comprises a transformer having a plurality of inputs each linked to one branch of the electric power supply line by a condenser.

20. The device of claim 15 further comprising a connector linked to the coupler to which a DSL modem is connected that receives digital signals passed by the coupler and sends digital signals passed through the coupler.

* * * * *